July 4, 1939.  S. H. KATZ ET AL  2,164,330
FULLY MOLDED GAS MASK FACEPIECE
Filed July 10, 1937   3 Sheets-Sheet 2

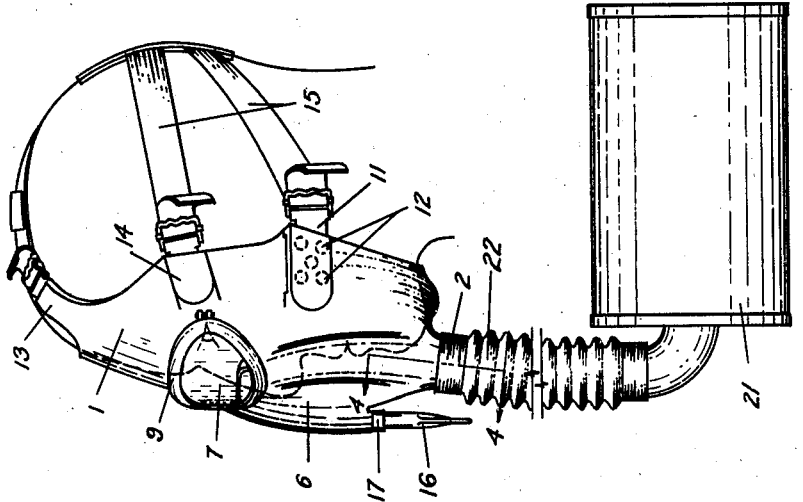
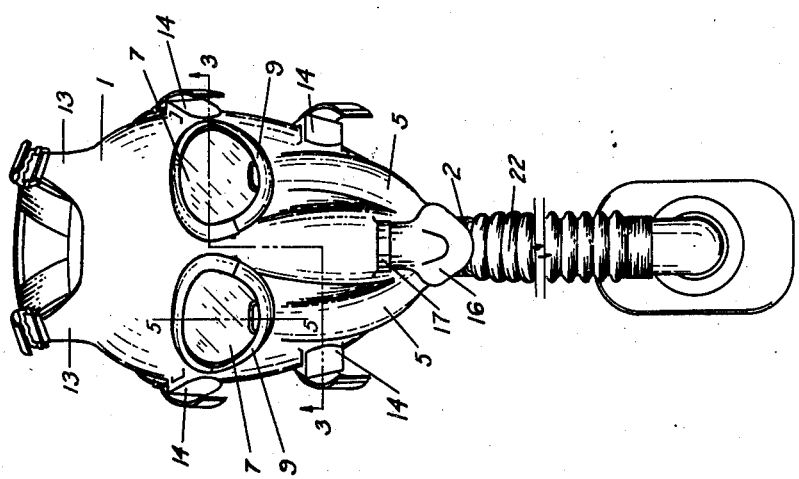
INVENTORS
SIDNEY H. KATZ
DALLAS O. BURGER

INVENTORS
SIDNEY H. KATZ
DALLAS O. BURGER
BY
ATTORNEY

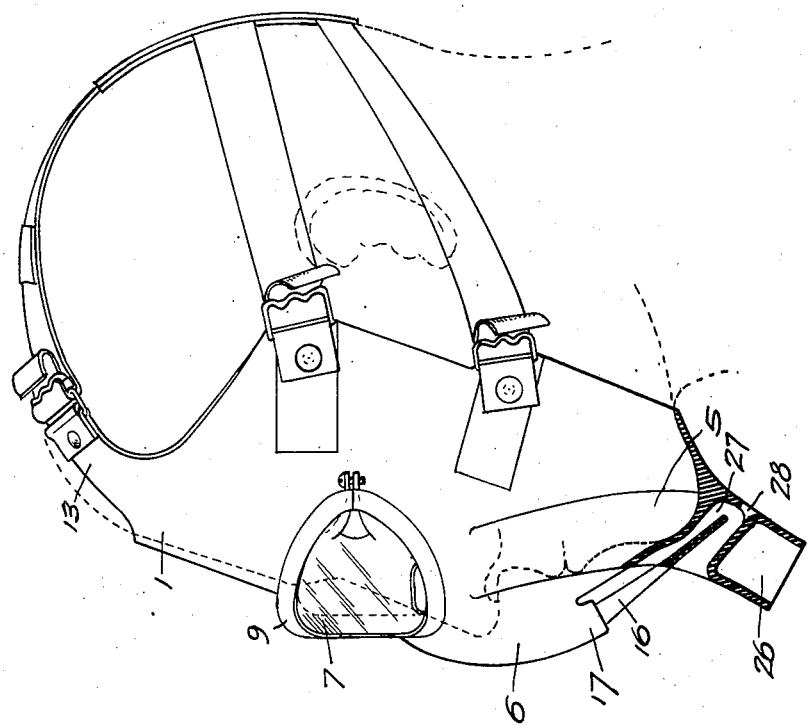
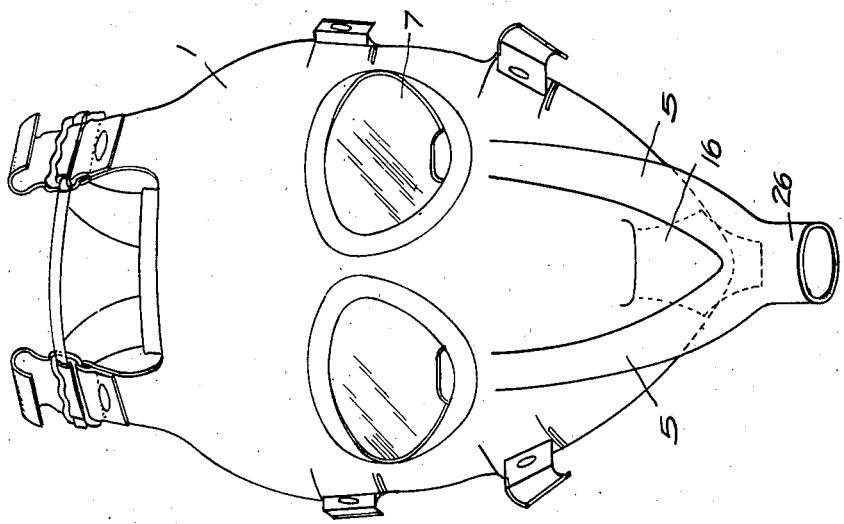

Patented July 4, 1939

2,164,330

UNITED STATES PATENT OFFICE 2,164,330

FULLY MOLDED GAS MASK FACEPIECE

Sidney H. Katz, Edgewood Arsenal, and Dallas O. Burger, Belair, Md., assignors to the Government of the United States of America, as represented by the Secretary of War Application July 10, 1937, Serial No. 152,954

8 Claims. (Cl. 128—141)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an improvement in gas masks, and more particularly to gas mask facepieces made from rubber by molding processes.

One of the difficulties encountered in the wearing of a gas mask has been the condensation of moisture on the inner surfaces of the lenses, thus seriously interfering with the vision of the wearer. It has been common practice to coat the inner surfaces of the lenses with a compound to prevent this condensation. Also metal castings known as angle tubes have been attached to the front of the masks, having interior passageways to direct inspired air over the lenses. One example of such an angle tube is shown and described in Patent #1,762,695 granted June 10, 1930 to R. Monro.

These angle tubes are complicated and expensive to manufacture, add materially to the weight of the gas mask, and require careful assembly to the mask.

One object of this invention is to provide a gas mask facepiece in which integral channels are formed in the facepiece whereby the inspired air is impinged directly on the lenses to prevent condensation of moisture.

Another object of this invention is to provide a gas mask facepiece having integral channels or passages joined at their lower ends to a common passage to which is directly connected the air hose of the protective canister, thus eliminating the heretofore used metal angle tube.

Another object of this invention is to provide a gas mask facepiece which is manufactured by a molding or semi-molding process and having integral passages as above described which are streamlined into the facial contour of the facepiece, thus eliminating excessive projections which might catch on clothing or other articles.

A further object of this invention is to provide a gas mask facepiece with the integral passages as described and an air outlet valve so positioned that the usual metal guard therefore may be eliminated.

These and other objects of the invention will be apparent from the following description and claims, with the understanding that the invention is not limited to the details of construction herein described.

In the drawings,

Fig. 1 is a front elevation of the complete facepiece.

Fig. 2 is a side elevation thereof with canister attached.

Figure 8:
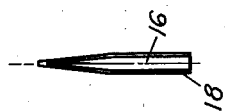
Figure 7:
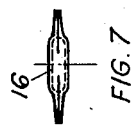
Figure 6:
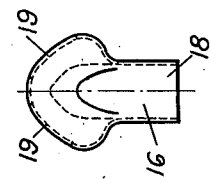

Figs. 6, 7, and 8 are an elevation, a top plan and a longitudinal section of the outlet valve.

Fig. 9 is a front elevation, and Fig. 10 a side elevation partly in section of a modified arrangement of the outlet valve.

Referring to Figs. 1 and 2, the mask comprises the main facepiece 1 of rubber or similar material molded or cast in one piece. The facepiece is shaped to the contour of the human face and extends beneath the chin, up the sides of the face and across the forehead. The facepiece stands away from the nose and mouth as seen in Fig. 2 and the inlet for inspired air is just below the mouth of the wearer.

Figure 4:
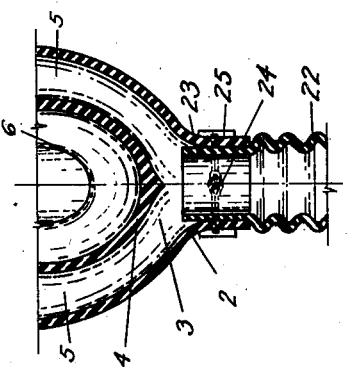
Fig. 4 is a sectional detail partly in elevation showing the merging of the air channels and the connection of the inlet hose.
Figure 5:
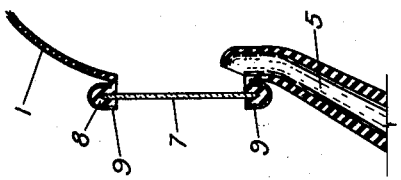
Fig. 5 is a section through the eyepiece showing the mounting of the lenses.

The air inlet is formed by a cylindrical downwardly extending nipple 2 integral with the facepiece. This inlet opens into a chamber 3 separated from the exhalation space 6 by a wall 4. As seen in Fig. 4, the wall 4 terminates in a ridge and two integral inlet passages 5 lead upwardly on opposite sides of the exhalation chamber 6. Inlet passages 5 turn outwardly at their upper ends as seen in Figures 2 and 5 so that incoming air is impinged directly on the lenses 7.

Lenses 7 are horizontally curved and are preferably of glass, though other transparent material may be used, such as Celluloid, cellulose compounds or synthetic resins. As seen in Fig. 5, the facepiece material 1 is molded with an enlarged bead 8 surrounding the eye openings and on the outside of the facepiece. Each bead is provided with a groove into which the lens is seated. Due to the flexibility and elasticity of the facepiece material, the bead 8 may be distorted to seat the lens in the groove. Then a crimping ring 9 is placed over bead 8 and clamped in place.

Metal or fabric inserts for connection to the head harness are integrally molded into the facepiece. These inserts 11 are straps having openings 12 (see Fig. 2) through which the soft rubber passes to bind the inserts securely to the facepiece. The two inserts 11 at the top of the facepiece are molded into thickened tabs 13 which extend from the facepiece. The four inserts 11 on the sides of the facepiece are molded into portions 14 which are connected to the main portion of the facepiece at their ends. (See Fig. 3.)

The inserts 11 have eyes to which buckles for attaching the head harness straps 15 are connected. When the mask is worn the spaced portions 14 exert a force inwardly at their outer ends to cause a tight fit of the periphery of the mask.

As seen in Figs. 6, 7 and 8, valve 16 has two walls of thin rubber forming a substantially triangular head which merge into a shank 18 for connection to nipple 17. The walls of the head portion are spaced from one another in the center and then approach at their edges, thus forming in effect a fin extending around the head.

The edges of the fins are not connected at spaces 19, Fig. 6, to allow exhaled air to escape. It will be seen that the valve 16 is streamlined, that is, that there are no protuberances or corners to interfere with free exit of air.

An air purifying canister 21 is connected to inlet nipple 2 by a corrugated inlet hose 22. As seen in Fig. 4, this connection is made by telescoping hose 22 into nipple 2, with a metal inner nipple 23. A binding wire 24 covered with a strip of adhesive tape 25 completes the connection.

The outlet valve 16 is similarly connected to the nipple 17.

Further protection is provided for the outlet valve 16 in the modification shown in Figs. 9 and 10. The inlet nipple 26 merges into the deflector channels 5 just below the chin portion of the facepiece, thus providing a pocket 27 into which the outlet valve 16 projects. The outlet nipple 17 is slanted more toward the chin portion as seen in Fig. 10. An opening 28 is provided in the lower portion of pocket 27 to allow escape of moisture which may pass out of the outlet valve. By this construction, the outlet valve is protected from the front and sides, and the exhalation chamber 6 is reduced in size, thus reducing the dead air space in the facepiece.

Figure 3:
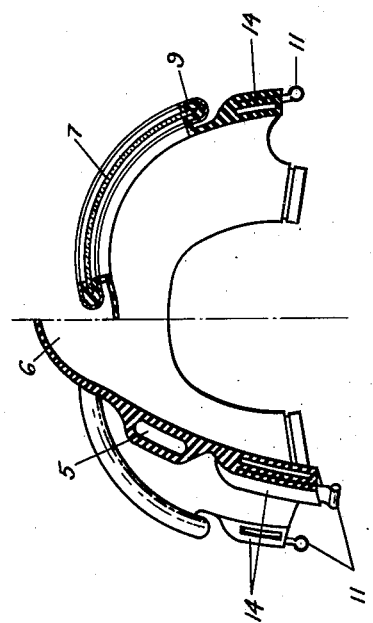
Fig. 3 is a section on line 3—3 of Fig. 1 with the head harness removed.

As seen in Figure 3, the facepiece material at the front of exhalation chamber 6 is made thinner than the remainder of the facepiece, this thin front portion tapering toward the sides. By this construction, voice transmission through the facepiece is facilitated, since this thin portion directly in front of the wearer's mouth readily transmits voice vibrations. This same arrangement is used in the form shown in Figs. 9 and 10.

By the construction herein described, the assembly operations are reduced to a minimum. The lenses are easily secured in place and the head harness, outlet valve and inlet hose are readily connected to the facepiece. The facepiece may be made by one or more processes. Unvulcanized sheets of rubber may be placed beneath cores for inlet channels 5, and other sheets so placed in a mold or press that they are all integrally united when vulcanized. Or the facepiece may be made of rubber latex poured into molds and hardened. Or the facepiece may be made by a process of dipping molds into a solution of rubber or rubber latex.

Passages 5 cause the incoming air to pass directly to the lenses around both sides of the exhalation chamber, and thence into this chamber where it can be drawn into the lungs. The exhalation valve 16 is placed in front of and just below the mouth so that the wearer of the mask may speak through the valve and be understood. The design of the valve prevents chattering due to exhalation or speech. The thin section of the facepiece directly in front of the wearer's mouth readily transmits voice vibrations and in combination with the outlet valve makes the voice distinctly understood.

It will be understood that the invention is not limited to the precise details herein shown, since changes may be made therein by those skilled in the art without departing from the invention or exceeding the scope of the appended claims.

We claim:

1. A gas mask facepiece of rubber or other plastic material having transparent lenses, two deflector tubes extending upwardly along the cheek portions and having their upper ends turned outwardly at the lower edges of the lenses, an inlet tube beneath and in front of the chin portion of said facepiece, said deflector tubes joined to said inlet tube, an outlet tube forwardly of the inlet tube, said deflector tubes, inlet tube and outlet tube being integral with the facepiece, and an inlet hose and an outlet valve directly connected to the inlet tube and outlet tube, respectively.

2. A molded gas mask facepiece of rubber or the like having an exhalation chamber in front of the wearer's mouth and nose, a pair of deflector tubes extending upwardly on opposite sides of the exhalation chamber, said tubes merging at their lower ends beneath the chin portion into a downwardly extending inlet nipple, an outlet nipple at the forward lower portion of the exhalation chamber, said inlet and outlet nipples and deflector tubes being integral with the facepiece, an inlet hose connected to said inlet nipple, and an outlet valve connected to said outlet nipple, said outlet valve extending downwardly in front of and adjacent to the inlet hose whereby the outlet valve is protected by the hose.

3. The invention as described in claim 2, wherein the axes of the outlet valve and inlet hose converge downwardly.

4. A molded gas mask facepiece of rubber or the like having transparent lenses, two deflector tubes extending upwardly along the cheek portions and having their open ends adjacent the lower edges of the lenses, said tubes merging at their lower ends into a downwardly extending inlet nipple, an outlet nipple forwardly and above the inlet nipple, said deflector tubes, inlet nipple and outlet nipple being integral with the facepiece, and head harness connectors at spaced points on the periphery of the facepiece said connectors being molded integral with the facepiece.

5. A gas mask facepiece of rubber or other plastic material having transparent lenses, two deflector tubes extending upwardly along the cheek portions in front of and between which is an exhalation chamber, the front wall of said exhalation chamber being thinner than the remainder of the facepiece to thereby increase the transmission of voice sounds.

6. The invention as defined in claim 5 wherein the facepiece material tapers into the front wall of the exhalation chamber, said front wall being of the order of thinness of a sound transmitting diaphragm.

7. A gas mask facepiece of rubber or other plastic material having transparent lenses, two air inlet deflector tubes extending upwardly along the cheek portions, said tubes merging at their lower ends to form a common air inlet nipple, said inlet nipple being spaced from the front of the chin portion of the facepiece to thereby form a cavity, and an outlet valve connected to the facepiece and projecting into the cavity between the inlet nipple and the chin portion of the facepiece.

8. The invention as defined in claim 7 wherein said deflector tubes define an exhalation chamber in front of the wearer's mouth and nose, said outlet valve being connected to the lower portion of said chamber, said valve extending downwardly substantially parallel to the wall forming the chin portion of the facepiece.

DALLAS O. BURGER.
SIDNEY H. KATZ.